United States Patent [19]

Groth, Jr.

[11] 4,425,666
[45] Jan. 10, 1984

[54] DATA ENCODING AND DECODING COMMUNICATION SYSTEM FOR THREE FREQUENCY FSK MODULATION AND METHOD THEREFOR

[75] Inventor: Edward J. Groth, Jr., Scottsdale, Ariz.

[73] Assignee: Motorola Inc., Schaumburg, Ill.

[21] Appl. No.: 344,149

[22] Filed: Jan. 29, 1982

[51] Int. Cl.³ .................................... H03K 13/24
[52] U.S. Cl. .................................... 375/48; 375/56; 340/347 DD
[58] Field of Search ............... 375/48, 55, 56, 89; 371/55, 56, 57, 67, 68; 340/347 DD; 329/110, 112

[56] References Cited

U.S. PATENT DOCUMENTS

| | | | |
|---|---|---|---|
| 3,652,988 | 3/1972 | Yamamoto et al. | 371/55 |
| 3,911,395 | 10/1975 | Koike | 371/56 |
| 3,924,186 | 12/1975 | Gordy et al. | 375/56 |
| 4,035,767 | 7/1977 | Chen et al. | 375/56 |

Primary Examiner—Marc E. Bookbinder
Assistant Examiner—Stephen Chin
Attorney, Agent, or Firm—Eugene A. Parsons

[57] ABSTRACT

A system for three frequency FSK modulation wherein binary data bits are sequentially encoded into a ternary system of channels designated "1", "0" and "C", so that a data bit is encoded and transmitted in a "C" channel whenever it is the same as the previous data bit and wherein a transmission in the "C" channel is decoded as a continuation of the previous data bit. The data clock is recovered from the data stream at the transition between data bits and repeated data bits are detected as errors.

15 Claims, 3 Drawing Figures

DATA ENCODING AND DECODING COMMUNICATION SYSTEM FOR THREE FREQUENCY FSK MODULATION AND METHOD THEREFOR

BACKGROUND OF THE INVENTION

The present invention relates to data encoding and decoding systems and in particular to data encoding and decoding systems for frequency-shift key (FSK) modulation and methods therefor.

It is important in a communication system that the same data clock be available to both the transmitter and the receiver of data sequences. To that end, data clocks having a desired frequency and phase relationship can be generated simultaneously in the transmitter and in the receiver, or the data clock can be transmitted from the transmitter to the receiver. Complications arise when it is necessary or desirable to use any of a number of clocks that might be supplied to the transmitter. Likewise, a problem exists when it is inconvenient or undesirable to transmit the data clock separately from the data, as may be the case in covert communications systems. In either case it is desirable to be able to retrieve the data clock from the data stream.

One approach to retrieving the data clock from the data stream involves Manchester encoding wherein each data bit is encoded into two opposite symbols. In view of the fact that two symbols are used for each data bit, a Manchester encoded FSK transmission must have twice the bit rate as an un-encoded transmission in order to transmit the same amount of data in a given time. In as much as bandwidth is related to time because it expresses frequency, doubling the bit rate by using Manchester encoding requires doubling the bandwidth.

Although the transition at the center of every Manchester encoded bit provides a means to recover the data clock from the data stream, there are drawbacks. For example, the data IF channels must have twice the bandwidth of the data, imposing three dB more noise on the detection process. Furthermore, there is an inherent clock phase ambiguity of pi, which can be resolved only after the reception of a number of data transitions. Before resolution, the data may be (with 50% probability) ambiguous.

SUMMARY OF THE INVENTION

Accordingly it is an object of the present invention to provide a new and improved system of encoding and decoding for FSK modulation.

It is a further object of the present invention to provide a new and improved method of encoding and decoding for FSK modulation wherein the data clock can be unambiguously recovered from the data stream.

Another object of the present invention is to provide a new and improved system of encoding and decoding for FSK modulation wherein only one symbol is required for one or more data bits as opposed to the two symbols required in Manchester encoding.

Yet another object of the present invention is to provide a new and improved method for FSK modulation.

Still another object of the present invention is to provide a new and improved method of recovering a data clock from a FSK modulated data stream according to the present invention.

Among the advantages of the present invention is the spreading of power over a greater number of channels than is normally used with FSK modulation, an important consideration for a covert system.

Also among the advantages of the present invention is an increased ability to detect errors in the decoded data stream.

These and other objects and advantages of the present invention will become apparent to those skilled in the art upon consideration of the accompanying specification, claims and drawings.

In order to attain the above mentioned and other objects a system for the communication of sequences of bits of data wherein a transmitter has means for serially encoding into Q-ary symbols and transmitting Q-ary symbols signals along a plurality of channels, at least one of the channels being devoted to transmitting a Q-ary symbol in place of every second Q-ary symbol from the beginning of a string of repeated Q-ary symbols such that no two similar Q-ary symbols in succession are transmitted along the same channel, and wherein a receiver has means for serially receiving and decoding the Q-ary symbol signals to reconstruct the sequence of bits which means for serially receiving and decoding is triggered by transmission of a Q-ary symbol signal along the channel devoted to transmitting every second Q-ary symbol from the beginning of a string of repeated Q-ary symbols to repeat the preceding Q-ary symbol.

The method of the present invention comprises encoding a sequence of bits into a sequence of Q-ary symbol signals and transmitting the Q-ary symbol signals along a plurality of channels such that at least one channel is devoted to transmission of a Q-ary symbol in place of every second Q-ary symbol from the beginning of a series of successively repeated Q-ary symbols, switching transmission along the channels between Q-ary symbol signals so that no channel is used twice in succession, receiving the Q-ary symbol signals along the channels, decoding the Q-ary symbol signals into the sequence of bits such that the Q-ary symbols are sequenced in the order received, and such that reception of a Q-ary symbol signal along the channel used for transmission of the Q-ary symbol in place of successively repeated Q-ary symbols is used to trigger the output of a repetition of the preceding Q-ary symbol.

In addition, the present invention provides a method of recovering a data clock from a plurality of channels having a sequence of bits of data encoded into Q-ary symbols and transmitted as Q-ary symbol signals having overlapping rise and fall times and being ordered so that no channel is used to transmit two Q-ary symbol signals in succession, comprising the steps of multiplying the channel Q-ary symbol signal levels together in all combinations, and summing the results of the multiplications to generate pulses indicative of the data clock.

The present invention also provides a method for detecting errors in the Q-ary symbol signals along a plurality of channels containing a sequence of bits of data encoded into Q-ary symbols such that no channel is used to transmit two Q-ary symbol signals in succession by comparing the present Q-ary symbol signal level with the previous Q-ary symbol signal level in the same channel and by providing an output signal indicative of an error whenever any two Q-ary symbol signals are received along any channel in succession.

DESCRIPTION OF THE PREFERRED EMBODIMENT

Figure 1:
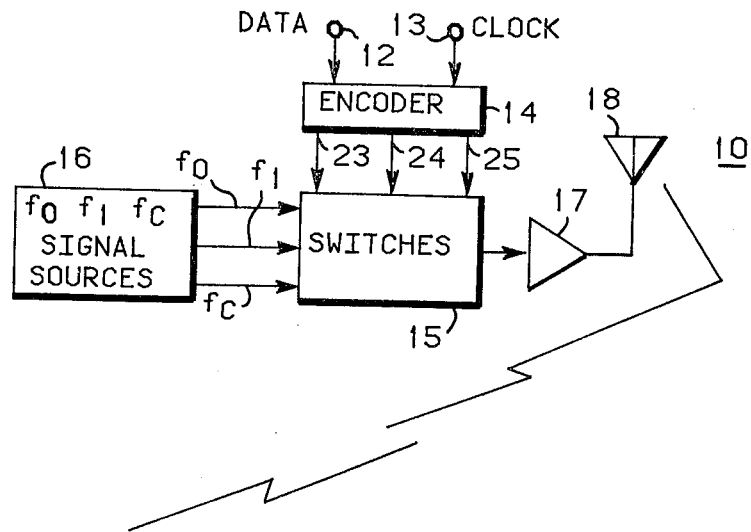
FIG. 1 is a block diagram of a system embodying the present invention.

In a preferred embodiment of the FSK modulation system for the communication of sequences of bits of data as illustrated in FIG. 1, a transmitter 10 contains an encoder 14 having a data input terminal 12 and a clock input terminal 13. Encoder 14 has three encoded outputs, 23, 24, and 25. Outputs 23, 24 and 25 respectively enable an $f_1$ channel, and $f_C$ channel and an $f_0$ channel switch in a switching structure 15 which when enabled respectively passes signals at frequencies $f_1$, $f_C$ and $f_0$, which signals are provided to switching structure 15 by a signal source structure 16. The output of switching structure 15 is coupled to the input of amplifying apparatus 17. The output of amplifying apparatus 17 is supplied to an antenna 18. Amplification apparatus 17 and antenna 18 may be of the sort commonly found in the FSK transmitters of the prior art. Switching apparatus 15 and signal source apparatus 16 are readily obtained by one skilled in the art by addition of a third signal source and a third switch, respectively, to the two signal sources and two switches found in prior art apparatus.

In a preferred embodiment of a receiver 11 according to the system of the present invention as shown in FIG. 1, an antenna 19 is coupled to an input of an amplification apparatus 20. An output of amplification apparatus 20 is supplied to a filtering structure 21. Filtering structure 21 supplies three inputs, 51, 52 and 53, of the decoder 22. Decoder 22 has a data output 91, a data clock output 92, and an error flag output 93. Antenna 19, amplification apparatus 20, and filtering structure 21 are readily obtainable to those skilled in the art upon appropriate modification of prior art FSK receivers to accommodate a third channel in addition to the two normally found in such receivers. The novel structures for encoder 14 and decoder 22 according to the system of the present invention are described below.

The system of the present invention encodes repeated data bits or continuations of the data stream in a separate channel. For the simpliest case and that of the preferred embodiment, the algorithm involves encoding a binary data stream into a ternary data stream with a rate of 1; that is, one ternary symbol appears from the encoder for each binary data bit that enters. The ternary symbols are called 1, 0, and C. The symbol C implies continuation of the binary stream and represents one of 3 FSK frequencies. The algorithm for encoding is:
(1) Send a symbol equal to the data bit, go to step (2);
(2) If the next data bit repeats, send C; otherwise, send symbol equal to data bit, go to step (1).

The algorithm is equivalent to sending a C any time the previous data bit is the same as the present. For example, the data sequence

111100010011010 would be encoded by the system of the present invention as

1C1C0C010C1C010.

The decoding algorithm is:
If a 0 or a 1 symbol is received, output a data bit equal to the symbol; if a C is received, output a data bit continuation of the previous data bit.

The usual two frequency FSK noncoherent system employs 1 level bit data bits encoded in a "mark" frequency channel and 0 level data bits encoded in a "space" frequency channel. The FSK noncoherent system of the preferred embodiment adds to the usual system a "continuation" frequency channel in which repeated bits are encoded. The preferred embodiment of the present invention has several advantages over the usual FSK system. For example, the code rate is 1 (one symbol is sent for each data bit presented), so that a lower data rate is required than for Manchester encoding. Furthermore, in the absence of errors it is evident that no symbol is ever followed by one of the same type. Hence, in the receiver there is a symbol signal transition at every data bit time, and this provides an indication of the data clock. Also, errors are detectable by the occurrence of double symbols in the data stream and the error location can be flagged for future examination. In addition, given that the data is reasonably random, as it should be if reasonable source encoding is employed, it is easily shown that the occupancy of the three symbol frequency channels (0, 1, C) is uniform. It is then especially desirable to provide a three frequency FSK system when covertness is the primary objective.

One skilled in the art understands from the above discussion that the present invention involves the encoding of groups of bits in Q-ary symbols, that is in symbols representing a "Q" number of bits. Encoding in Q-ary symbols involves dividing the incoming data stream of bits into groups, for example 3 bits per group, which become symbols. The encoding further involves creating a symbol signal for each type of group plus an additional one for a continuation symbol that is used whenever two of the same symbols appear in a row. Decoding involves outputting the groups of bits represented by the symbols as received except when a "C" symbol signal arrives, in which case the sequence represented by the previous symbol signal received is delivered. Errors are detected in the same manner as in the preferred embodiment. A clock is recovered in the same manner as in the preferred embodiment because a transition from one symbol to another occurs at every clock time. It is clear that more channels are required than for the preferred embodiment. For example, 3 bits per symbol gives $2^3 = 8$ unique symbols plus the "C" symbol for 9 required channels.

Extending the present invention to Q-ary symbols representing more than one bit each, as opposed to the Q-ary symbols representing one bit each used in the preferred embodiment, has advantages. At two bits per symbol, for example, the symbol rate is half the bit rate so that the decision bandwidth (that is the bandwidth of the operation of deciding which channel has the symbol in it) is halved. Furthermore, because transmission is spread over more frequencies, which is useful in itself in covert applications, transmitter power requirements are reduced.

Figure 2:
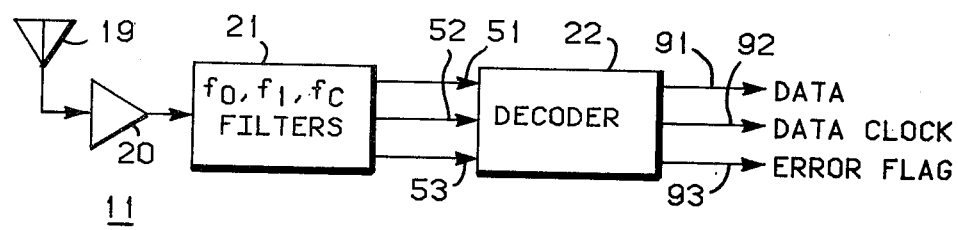
FIG. 2 is a schematic diagram of a preferred embodiment of an encoder according to the present invention.
Figure 2:
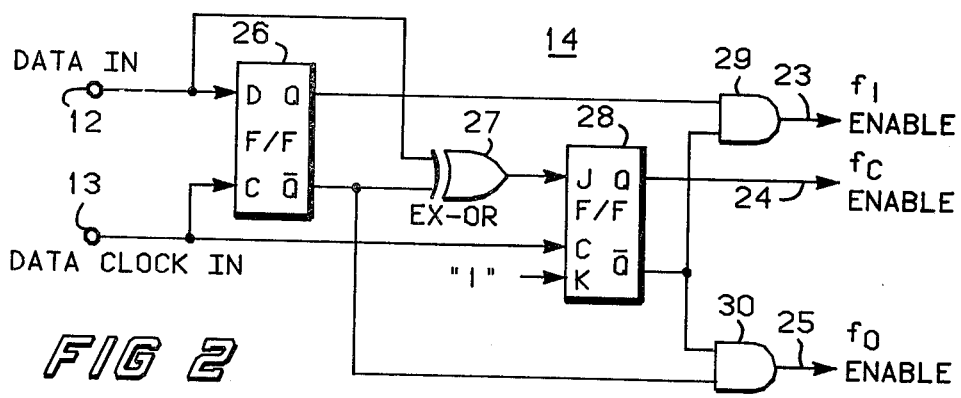

In order to examine a preferred embodiment of an encoder according to the present invention, we turn now to FIG. 2. Data input terminal 12 is coupled to a D input of a D-type flip-flop 26 and to a first input of an exclusive OR gate 27. Data clock input 13 is coupled to a C input of flip-flop 26 and to a C input of a J-K flip-flop 28. A Q output of flip-flop 26 is coupled to a first input of an AND gate 29, while a $\overline{Q}$ output of flip-flop 26 is coupled to a second input of exclusive OR gate 27 and to a first input of an AND gate 30. The output of exclusive OR gate 27 is coupled to a J input of flip-flop 28. A K input of flip-flop 28 is maintained at a data level of 1. A Q output of flip-flop 28 is coupled to encoder output 24 which is in turn coupled to the $f_C$ switch in structure 15. A $\overline{Q}$ output of flip-flop 28 is coupled to a second input of AND gate 29 and to a second input of AND gate 30. The output of AND gate 29 is coupled to encoder output 23 which is in turn coupled to the $f_1$ switch in structure 15 of FIG. 1. The output of AND gate 30 is coupled to encoder output 25 which is in turn coupled to the $f_0$ switch in structure 15.

In the operation of encoder 14 as shown in FIG. 2, digital data is applied to input 12. In general, the encoder operates so that flip-flop 26 directs an input bit to the "1" or "0" channel appropriate to its level, while exclusive OR gate 27 toggles flip-flop 28 to direct every second repeated bit of either the "1" or the "0" type to the "C" channel. There being three possible types of inputs, there are six possible combinations of present input and preceding output (0/1, 00, 0/C, 1/1, 1/0, 1/C). For the sake of illustration, the three combinations for the 0 level input type are described below. The input/output combinations for the 1 level input type can readily be determined by one skilled in the art from the consideration of these illustrations.

At the outset it should be noted that positive logic is employed throughout the preferred embodiments of the encoder 14 and the decoder 22. Nevertheless, it is obvious to one skilled in the art that negative logic may be used if appropriate modifications requiring only mechanical skill are made.

Where the preceding output type was $f_0$ and the present input type is a 0 level bit, before application of a clock pulse, the level of the output of AND gate 29 is 0, the level of the Q output of flip-flop 28 is 0 and the level of the output of AND gate 30 is 1. Therefore, both inpus of AND gate 30 must be at the 1 level and, consequently, the $\overline{Q}$ output of flip-flop 28 and the $\overline{Q}$ output of flip-flop 26 are also at the 1 level. Furthermore, this means that the second input of AND gate 29 and the second input of exclusive OR gate 27 must also be at the 1 level corresponding to the $\overline{Q}$ input to which they are respectively coupled. The level of the Q output of flip-flop 26, being the compliment of the level of the $\overline{Q}$ output, must be 0, and therefore the first input of AND gate 29 must be at the 0 level. Because a 0 level bit is applied to the D input of flip-flop 26, both the D input of flip-flop 26 and the first input of exclusive OR gate at 27 to which it is coupled are at the 0 level. Furthermore, because the first input of exclusive OR gate 27 is at 0 level and the second input is at the 1 level, the output of exclusive OR gate 27 is at the 1 level as is the J input to flip-flop 28 to which it is coupled. Application of a clock pulse to the C inputs of flip-flops 26 and 28 produces no change in the outputs of flip-flop 26, but causes the outputs of flip-flop 28 to toggle due to the presence of a 1 level bit at both of its inputs. Therefore, output of $f_C$ output 24 changes from 0 to 1 resulting in transmission of "C" symbol, the level of $f_0$ output 25 changes from 1 to 0 and the level of $f_1$ output 23 remains at 0.

Now that conditions for a "C" symbol output have been established, the result of applying another 0 level bit as the next input bit in sequence is easily understood. The D input of flip-flop 26 and the first input of the exclusive OR gate 27 remain at the 0 level, and the second input of exclusive OR gate 27 remains at the 1 level so that the output of exclusive OR gate 27 and the input of flip-flop 28 remain at the 1 level. Therefore, when a clock pulse is applied at the C inputs of flip-flops 26 and 28, flip-flop 26 remains unchanged and flip-flop 28 toggles so that its Q output changes to a 0 level and its $\overline{Q}$ output changes to the 1 level. The $f_C$ output 24 is at the 0 level and, although the second input of AND gate 29 is thus at the 1 level, the first input of AND gate 29 remains at the 0 level so that the $f_1$ output 23 is at the 0 level. However, the first input to AND gate 30 is shifted to the 1 level so that both inputs to AND gate 30 are at the 1 level and therefore output 25 which enables the $f_0$ channel is at the 1 level and a "0" symbol is transmitted.

The last possible combination of a present 0 level input is with a preceding output enabling the $f_1$ channel. In that case, the output of AND gate 29 is at a 1 level so that both of its inputs must be at the 1 level. Because the first input of AND gate 29 is coupled to the Q output of flip-flop 26 and because the second input of AND gate 29 is coupled to the $\overline{Q}$ output of flip-flop 28, which is in turn coupled to the first input of AND gate 30, those inputs and outputs must be at the 1 level prior to the application of a clock pulse. Because the Q output of flip-flop 28 is complimentary to the $\overline{Q}$ output of flip-flop 28, it must be at the 0 level. Likewise, because it is complimentary to the Q output of flip-flop 26, the $\overline{Q}$ output of flip-flop 26, and hence the second input of exclusive OR gate 27 and the first input of AND gate 30, must be at the 0 level. Application of a 0 level bit at the D input to flip-flop 26 places that input and the first input of exclusive OR gate 27 to which it is coupled at the 0 level. Because both inputs to exclusive OR gate 27 are thus at the 0 level, the output level of exclusive OR gate 27 goes to 0 along with the level of the J input to flip-flop 28 to which it is coupled. Therefore, when a clock pulse is applied to the C inputs of flip-flops 26 and 28, the Q output of flip-flop 26 is shifted to the 0 level of its D input as is the level of the first input of AND gate 29 to which it is coupled. Simultaneously the $\overline{Q}$ output of flip-flop 26 changes to the 1 level as does the first input of AND gate 30 to which it is coupled. Because the J input of flip-flop 28 is at the 0 level at the application of the clock pulse, outputs Q and $\overline{Q}$ of flip-flop 28 remain at the levels of 0 and 1 respectively. Therefore, only the second input of AND gate 29 is at the 1 level so that its output is at the 0 level. Both inputs to AND gate 30 are at the 1 level so that its output is at the 1 level. Thus, only the $f_0$ channel is enabled and a "0" symbol is transmitted.

Figure 3:
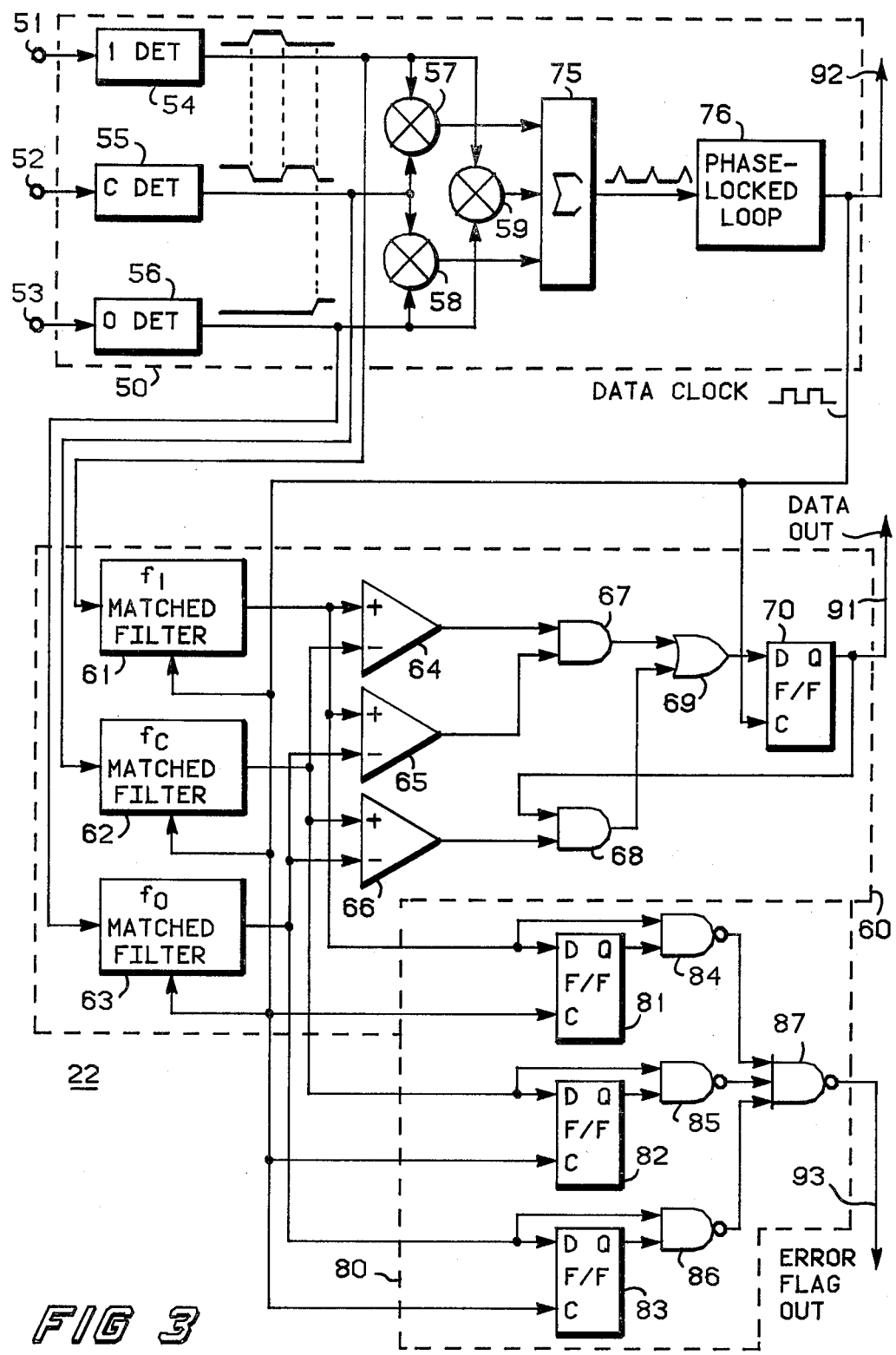
FIG. 3 is a schematic diagram of a preferred embodiment of a decoder according to the present invention.

Turning now to FIG. 3, it can be seen that decoder 22 comprises a data clock recovery structure 50, a data recovery structure 60, and an error indicating structure 80.

In data clock recovery structure 50, as illustrated in FIG. 3, decoder inputs 51, 52 and 53 are respectively coupled to an input of a "1" channel detector 54, an input of a "C" channel detector 55 and an input of a "0" channel detector 56. An output of "1" channel detector 54 is coupled to an input of a multiplier 57 and to an input of a multiplier 59. An output of "C" channel detector 55 is coupled to an input of multiplier 57 and to an input of a multiplier 58. An output of "0" channel detector 56 is coupled to an input of multiplier 58 and to an input of multiplier 59. Outputs from multipliers 57, 58 and 59 are coupled to the inputs of a summation device 75. An output of summation device 75 is coupled to an input of a phase-locked loop 76. An output of phase-locked loop 76 is coupled to data clock output 92 of decoder 22.

The outputs of "1" channel detector 54, "C" channel detector 55 and "0" channel detector 56 in data clock recovery structure 50 are respectively coupled to a first input of an $f_1$ frequency matched filter 61, a first input of an $f_C$ frequency matched filter 62, and a first input of an $f_0$ frequency matched filter 63. A second input to each of filters 61, 62 and 63 is coupled to the output of phase-locked loop 76 in data clock recovery structure 50. An output of $f_1$ filter 61 is coupled to a noninverting input of a comparator 64 and to a noninverting input of a comparator 65. An output of $f_C$ filter 62 is coupled to an inverting input of comparator 64 and to a noninverting input of a comparator 66. An output of $f_0$ filter 63 is coupled to an inverting input of comparator 65 and to an inverting input of comparator 66. An output of comparator 64 is coupled to a first input of an AND gate 67 while a second input of AND gate 67 is coupled to an output of comparator 65. An output of comparator 66 is coupled to a first input of an AND gate 68. An output of AND gate 67 and an output of AND gate 68 are respectively coupled to a first and a second input of an OR gate 69. An output of OR gate 69 is coupled to a D input of a D-type flip-flop 70, a C input of which is coupled to the data clock output of phase-locked loop 76 in data clock recovery structure 50. A Q output of flip-flop 70 is coupled to decoder data output 91 and to a second input of AND gate 68.

As also shown in FIG. 3., the data clock output of phase-locked loop 76 is coupled to a C input of a D-type flip-flop 81, to a C input of a D-type flip-flop 82 and to a C input of a D-type flip-flop 83, all in error indicating structure 80. An output of filter 61 is coupled to a D input of flip-flop 81 and to a first input of a NAND gate 84. An output of filter 62 is coupled to a D input of flip-flop 82 and to a first input of a NAND gate 85. Likewise, an output of filter 63 is coupled to a D input of flip-flop 83 and to a first input of a NAND gate 86. A Q output of flip-flop 81, a Q output of flip-flop 82 and a Q output of flip-flop 83 are respectively coupled to a second input of NAND gate 84, a second input of NAND gate 85 and a second input of NAND gate 86. An output of NAND gate 84, an output of NAND gate 85 and an output of NAND gate 86 are respectively coupled to a first input, a second input and a third input of a NAND gate 87. An output 93 of NAND gate 87 is coupled to the error indicating output 93 of decoder 22.

The operation of decoder 22 can be ascertained by an examination of FIG. 3. Data is provided to decoder 22 in the form of 0 and 1 level signals along the three outputs of filtering structure 21. Detector 54 operates on the signal received through decoder input 51, detector 55 operates on the signal received through decoder input 52 and detector 56 operates on the signal received through decoder input 53 to supply the detected 1, C and 0 Q-ary symbol signals at their respective outputs. As is illustrated by the signals shown at the outputs of detectors 54, 55 and 56, no one of the channels can have two 1-level output signals in succession, and the rise/fall times of two Q-ary symbol signals always overlap. Therefore, by multiplying the Q-ary symbol signals from detectors 54, 55 and 56 in all possible combinations in multipliers 57, 58 and 59, an output signal is obtained from one of the multipliers only during the overlapping rise/fall time when signals on 2 channels are simultaneously non-zero. By summing the outputs of multipliers 57, 58 and 59 in summation device 75, a train of pulses is obtained that is indicative of the data clock and which can readily be used by one skilled in the art to lock a phase-locked loop to provide a data synchronous clock at the output of the phase-locked loop. A phase-locked loop usable in the present invention is described in a copending application assigned to the same assignee, "Augmented Phase-Locked Loop For Very Wide Range Acquisition And Method Therefor", Ser. No. 344,150, filed by J. Bjornholt on Jan. 29, 1982.

In the operation of data recovery structure 60, the 3 channels from the outputs of detectors 54, 55 and 56 are applied to respective integrate and dump matched filters. The recovered data clock from the output of phase-locked loop 76 is used to synchronously drive the matched filters and clock the data at the optimal time. The outputs of the 3 matched filters are compared in comparators 64, 65 and 66. Because the decoding scheme does not allow successive outputs on any one channel, if the output of filter 61 is high, the noninverting inputs of comparator 64 and 65 are also high while the corresponding inverting inputs supplied by the outputs of filters 62 and 63, respectively, will be low. Consequently the outputs of comparators 64 and 65 are high so that both inputs of AND gate 67 are high. Since output of AND gate 67 is thus high, an input of OR gate 69 will be high and hence the output of OR gate 69 and the D input of flip-flop 70 will be at the 1 level. Therefore, when a clock pulse is next applied to the C input of flip-flop 70, a one level bit will appear at the Q output of flip-flop 70 and hence at decoder output 91. In this situation the status of the output of AND gate 68 is irrelevant.

If the output of filter 62 is high and the outputs of filters 61 and 63 are low, both inputs of comparators 65 are at the same level. Therefore, the output of comparator 65 is low and the input to AND gate 67 to which it is coupled is low so that the output of AND gate 67 is not at the 1 level. However, the noninverting input of comparator 66 is higher than its inverting input so that the output of comparator 66 and hence the input of AND gate 68 to which it is coupled are high. If the previous data bit which appears at the Q output of flip-flop 70 is a 1 level bit, both inputs to AND gate 68 are at the 1 level and hence its output is at the 1 level. Therefore, at least one input of OR gate 69 is at the 1 level, so that the output of OR gate 69 and hence the D input of flip-flop 70 are at the 1 level. When the next clock pulse is applied to the C input of flip-flop 70, the new 1 level bit is shifted to the Q output of flip-flop 70 to correctly decode the sequence 1, C as 1, 1. On the other hand, if the previous data bit which appears at the Q output of flip-flop 70 is a 0 level bit, both inputs of AND gate 68 and hence neither input of OR gate 69 will be at the 1 level. Therefore, a 0 level bit will wait at the D input of flip-flop 70 until a clock pulse is applied and the data bit shifts to the Q output to correctly decode the sequence of Q-ary symbols 0, C as the sequence of bits 0, 0.

If the output of filter 63 is high and the outputs of filters 61 and 62 are low, none of the comparators will have a high output and hence neither AND gate 67 nor AND gate 68 will have a 1 level output. Therefore, neither input to OR gate 69 and hence both its output and the D input of flip-flop 70 will be at the 0 level. At the application of the next clock pulse, the 0 level bit is shifted to the Q output of flip-flop 70 and hence to data output 91 of decoder 22.

Turning now to the error detection logic as shown in FIG. 3, type D flip-flops 81, 82 and 83 in error indicating structure 80 are clocked at their C inputs by the data clock from the output of phase-locked loop 76 in data clock recovery structure 50. Because the outputs of filters 61, 62 and 63 are respectively coupled to the D inputs of flip-flops 81, 82 and 83, and because filters 61, 62 and 63, flip-flops 81, 82 and 83 and flip-flop 70 are clocked in synchrony, the signal at the D inputs of flip-flops 81, 82 and 83 relates to the data bit at the D input to flip-flop 70. Likewise, the data bit at the Q output of flip-flop 70 relates to the signal at the Q outputs of flip-flops 81, 82 and 83. Furthermore, the first and second inputs of NAND gates 84, 85 and 86 are coupled to the D input and Q output of flip-flops 81, 82 and 83 respectively. Therefore, if a Q-ary symbol signal is erroneously received twice in a row on the same channel, both the D input and Q output of one of flip-flops 81, 82 and 83 are at the 1 level. Consequently one of NAND gates 84, 85 and 86 has a 0 level output and, hence, the output of NAND gate 87 is at the 1 level, indicating that the bit currently coming out of decoder data output 91 or the next bit to come out is an error. This "error flag" does not correct the error but does tag the error for future examination. If no one of the outputs of filters 61, 62 and 63 is high twice in succession, each of NAND gates 84, 85 and 86 has at least one input at the 0 level and hence all of the outputs of these NAND gates remain at the 1 level. As a result, all inputs to NAND gate 87 are at the 1 level and the output of NAND gate 87 is at the 0 level, indicating that no error is detected.

While the present invention has been described in terms of a preferred embodiment, further modifications and improvement will occur to those skilled in the art. For example, it would be obvious to extend the encoding and decoding schemes of the preferred embodiment to encompass greater numbers of channels for encoding more types of data and more possible combinations of repetitions, or even for simply increasing the number of channels to spread the power of the transmission over a wider band of frequencies for convert applications. Furthermore, although the unit of information employed in the preferred embodiment is the bit, the system of encoding and decoding according to the present invention is not limited to such a unit but rather may be used in systems employing other units including analog systems and systems using pulses encoded into various shapes, among others. In addition, although the data clock is supplied by the user to the system of the preferred embodiment, it would be obvious to one skilled in the art to incorporate a data clock within the transmitter if such data clock input flexibility is not required. Moreover, although the preferred embodiment is described in terms of three channels having fixed frequencies, one skilled in the art understands that, where desirable, the frequencies devoted to the encoded channels could be interchanged or could even be shifted entirely during transmission by making appropriate modifications in the transmitter and receiver which require only mechanical skill.

I desire it to be understood, therefore, that this invention is not limited to the particular form shown and I intend in the appended claims to cover all such equivalent variations which come within the scope of the invention as described.

I claim:

1. A system for the communication of a sequence of bits of data in the form of Q-ary symbol signals along a plurality of channels comprising:
   a transmitter having means for serially encoding into the Q-ary symbol signal and transmitting the Q-ary symbol signals along the plurality of channels such that at least one of the plurality of channels is devoted to transmitting a Q-ary symbol in place of every second Q-ary symbol from the beginning of a string of repeated Q-ary symbols such that no two Q-ary symbols in succession are transmitted along the same channel; and
   a receiver being responsive to said transmitter, having means for serially receiving and decoding said Q-ary symbol signals to reconstruct the sequence of bits of data, and being triggered by transmitting a Q-ary symbol signal along said at least one channel devoted to transmitting every second Q-ary symbol from the beginning of a string of repeated Q-ary symbols to repeat output of a preceding Q-ary symbol.

2. A transmitter for the encoded transmission of a sequence of bits of data in the form of Q-ary symbol signals along a plurality of channels comprising:
   means for encoding the bits of data into the Q-ary symbol signals such that every second bit from the beginning of a sequence of repeated bits is encoded in at least one of the plurality of channels said at least one of the plurality of channels being devoted to the transmitting a Q-ary symbol in place of repeated Q-ary symbols, having a data input, having a data clock input, and having a plurality of outputs;
   means for providing access to the plurality of channels having a plurality of inputs coupled to said plurality of outputs of said means for encoding, and having at least one output; and
   means for transmitting signals along the plurality of channels having at least one input coupled to said at least one output of said means for providing access to a plurality of channels.

3. A receiver for the reception of a sequence of bits of data in the form of Q-ary symbol signals along a plurality of channels at least one of the plurality of channels being devoted to the transmitting of a Q-ary symbol in place of repeated Q-ary symbols comprising:
   means for receiving signals along the plurality of channels having at least one output; and
   means for decoding the Q-ary symbol signals transmitted along the plurality of channels such that a Q-ary symbol signal transmitted along the at least one of the plurality of channels devoted to the transmitting of a Q-ary symbol in place of repeated Q-ary symbols is decoded as a repetition of the previous Q-ary symbol.

4. An encoder for encoded transmission of a sequence of bits of data along a plurality of channels comprising:
   a data clock input;
   a data input;
   means for encoding the sequence of bits of data into Q-ary symbol signals such that every second Q-ary symbol from the beginning of a sequence of Q-ary symbols is transmitted in at least one of the plurality of channels, said at least one of the plurality of channels being devoted to the transmitting of a Q-ary symbol in place of repeated Q-ary symbols, said means for encoding the bits of data having a first input coupled to said data clock input, having a second input coupled to said data input, and having a plurality of outputs; and a plurality of switching outputs coupled to said plurality of outputs of said means for encoding the bits of data.

5. The encoder as recited in claim 4 wherein said means for encoding the sequence of bits of data comprises:

a source of a logic level signal;

a first flip-flop having a first input coupled to said data input, having a second input coupled to said data clock input, having a first output and having a second output complementary to said first output;

a first logic gate having a first input coupled to said data input, having a second input coupled to said second output of said first flip-flop, and having an output;

a second flip-flop having a first input coupled to said output of said first logic gate, having a second input coupled to said source of a logic level signal, having a third input coupled to said data clock input, having a first output coupled to a first of said plurality of switching outputs and having a second output complementary to said first output;

a second logic gate having a first input coupled to said first output of said first flip-flop, having a second input coupled to said second output of said second flip-flop, and having an output coupled to a second of said plurality of switching outputs; and a third logic gate having a first input coupled to said second output of said first flip-flop, having a second input coupled to said second output of said second flip-flop and having an output coupled to a third of said plurality of switching outputs.

6. A decoder for use in the reception of encoded transmission of a sequence of bits of data as Q-ary symbol signals, clocked by a data clock along a plurality of channels, at least one of the plurality of channels being devoted to the transmitting a Q-ary symbol in place of repeated Q-ary symbols comprising:

a plurality of channel inputs;

means for comparing the signals along the plurality of channels having a plurality of inputs coupled to said plurality of channel inputs, and having a plurality of outputs;

logic means coupled to the plurality of outputs of said means for comparing, for decoding Q-ary symbol signals transmitted in the plurality of channels such that a Q-ary symbol encoded in the at least one of the plurality of channels devoted to the transmitting of a Q-ary symbol in place of repeated Q-ary symbols is decoded as a repetition of the previous Q-ary symbol; and means coupled to said logic means for providing a data output.

7. The decoder as recited in claim 6 further comprising means for recovery of the data clock having a plurality of inputs coupled to said plurality of channel inputs, and having an output indicative of the data clock.

8. The decoder as recited in claim 7 wherein said means for recovery of the data clock comprises:

means for multiplying the levels of the Q-ary symbol signals, two by two in all possible combinations having a plurality of inputs coupled to said plurality of channel inputs, and having a plurality of outputs;

means for summing signal levels having a plurality of inputs coupled to said plurality of outputs of said means for multiplying the level of the Q-ary symbol signals, and having an output, and means for providing an output indicative of the data clock having an input coupled to said output of said means for summing signal levels, and having an output coupled to said output indicative of the data clock.

9. The decoder as recited in claim 8 wherein said means for providing an output indicative of the data clock comprises a phase-locked loop.

10. The decoder as recited in claim 6 further comprising means for detecting errors in the form of two Q-ary symbol signals received in succession on the same channel.

11. A decoder for use in the reception of encoded transmission of a sequence of bits of data as Q-ary symbol signals, clocked by a data clock, along a plurality of channels, at least one of the channels being devoted to transmitting a Q-ary symbol in place of repeated Q-ary symbols, comprising:

a plurality of channel inputs;

a first detector having an input coupled to a first of said plurality of channel inputs and having an output;

a second detector having an input coupled to a second of said plurality of channel inputs and having an output;

a third detector having an input coupled to a third of said plurality of channel inputs and having an output;

a first multiplier having a first input coupled to said output of said first detector, having a second input coupled to said output of said second detector and having an output;

a second multiplier having a first input coupled to said output of said first detector, having a second input coupled to said output of said third detector, and having an output;

a third multiplier having a first input coupled to said output of said second detector, having a second input coupled to said output of said third detector, and having an output;

a means for summing having a first input coupled to said output of said first multiplier, having a second input coupled to said output of said second multiplier, having a third input coupled to said output of said third multiplier, and having an output;

a phase-locked loop having an input coupled to said output of said means for summing and having a data clock output;

a first filter having a first input coupled to said output of said first detector, having a second input coupled to said data clock output, and having an output;

a second filter having a first input coupled to said output of said second detector, having a second input coupled to said data clock output, and having an output;

a third filter having a first input coupled to said output of said third detector, having a second input coupled to said data clock output, and having an output;

a first comparator having a first input coupled to said output of said first filter, having a second input coupled to said output of said second filter, and having an output;

a second comparator having a first input coupled to said output of said first filter, having a second input coupled to said output of said third filter, and having an output;

a third comparator having a first input coupled to said output of said second filter, having a second output coupled to said output of said third filter and having an output;

a first logic gate having a first input coupled to said output of said first comparator, having a second input coupled to said output of said second comparator, and having an output;

a second logic gate having a first input coupled to said output of said third comparator, having a second input and having an output;

a third logic gate having a first input coupled to said output of said first logic gate, having a second input coupled to said output of said second logic gate, and having an output; and a first flip-flop having a first input coupled to said output of said third logic gate, having a second input coupled to said data clock output and having an output indicative of the sequence data bits coupled to said second input of said second logic gate.

12. The decoder as recited in claim 11, further comprising:

a second flip-flop having a first input coupled to said output of said first filter, having a second input coupled to said data clock output, and having an output;

a fourth logic gate having a first input coupled to said output of said first filter, having a second input coupled to said output of said second flip-flop and having an output;

a third flip-flop having a first input coupled to said output of said second filter, having a second input coupled to said data clock output, and having an output;

a fifth logic gate having a first input coupled to said output of said second filter, having a second input coupled to said output of said third flip-flop, and having an output;

a fourth flip-flop having a first input coupled to said output of said third filter, having a second input coupled to said data clock output, and having an output;

a sixth logic gate having a first input coupled to said output of said third filter, having a second input coupled to said output of said fourth flip-flop, and having an output; and a seventh logic gate having a first input coupled to said output of said fourth logic gate, having a second input coupled to said output of said fifth logic gate, having a third input coupled to said output of said sixth logic gate, and having an output indicative of errors in the form of two bits received in succession on the same channel.

13. A method of communicating bits of data in a sequence along a plurality of channels comprising the steps of:

encoding the sequence of bits of data into a sequence of Q-ary symbol signals and transmitting the Q-ary symbol signals along the plurality of channels such that at least one channel is devoted to the transmission of a Q-ary symbol in place of every second Q-ary symbol from the beginning of a series of successive Q-ary symbols;

switching transmission among the plurality of channels between transmission of successive Q-ary symbol signals so that no channel is used for transmission twice in succession;

receiving the Q-ary symbol signals along the plurality of channels; and decoding the Q-ary symbol signals into a sequence of bits of data such that the Q-ary symbols are sequenced in the order received and such that reception of a Q-ary symbol signal along said at least one channel devoted to transmission of a Q-ary symbol signal in place of successively repeated Q-ary symbols is used to trigger the output of a repetition of a preceding Q-ary symbol.

14. A method of recovering a data clock from a plurality of channels having a sequence of bits of data encoded into Q-ary symbols and transmitted as Q-ary symbol signals having overlapping rise and fall times and being ordered such that no channel is used to transmit two Q-ary symbol signals in succession, comprising the steps of:

multiplying the Q-ary symbol signal levels from the said plurality of channels together in all combinations; and summing the results of said multiplying step to generate pulses indicative of the data clock.

15. A method for detecting errors in the Q-ary symbol signals along a plurality of channels containing a sequence of bits of data encoded into Q-ary symbols such that no channel is used to transmit two Q-ary symbols in succession, comprising the steps of:

comparing the present Q-ary symbol signal level with the previous Q-ary symbol signal level in the same channel; and providing an output signal indicative of an error whenever any two Q-ary symbol signals are received along any channel in succession.

* * * * *